United States Patent
Bailey (10) Patent No.: US 10,151,926 B2
(45) Date of Patent: Dec. 11, 2018

(54) SYSTEMS, DEVICES, AND METHODS FOR PREVENTING EYEBOX DEGRADATION IN A WEARABLE HEADS-UP DISPLAY

(71) Applicant: THALMIC LABS INC., Kitchener (CA)

(72) Inventor: Matthew Bailey, Kitchener (CA)

(73) Assignee: NORTH INC., Kitchener (CA)

( * ) Notice: Subject to any disclaimer, the term of this patent is extended or adjusted under 35 U.S.C. 154(b) by 1 day.

(21) Appl. No.: 15/415,039

(22) Filed: Jan. 25, 2017

(65) Prior Publication Data

US 2017/0219829 A1  Aug. 3, 2017

Related U.S. Application Data

(60) Provisional application No. 62/288,947, filed on Jan. 29, 2016.

(51) Int. Cl.
G02B 27/01 (2006.01)

(52) U.S. Cl.
CPC .. *G02B 27/0172* (2013.01); *G02B 2027/0105* (2013.01); *G02B 2027/0118* (2013.01); *G02B 2027/0125* (2013.01); *G02B 2027/0174* (2013.01); *G02B 2027/0178* (2013.01)

(58) Field of Classification Search
None
See application file for complete search history.

(56) References Cited

U.S. PATENT DOCUMENTS

| 3,408,133 A | 10/1968 | Lee |
| 3,712,716 A | 1/1973 | Cornsweet et al. |
| 4,978,213 A | 12/1990 | El Hage |

(Continued)

FOREIGN PATENT DOCUMENTS

| JP | 61-198892 A | 9/1986 |
| JP | 10-319240 A | 12/1998 |

(Continued)

OTHER PUBLICATIONS

International Search Report and Written Opinion dated Apr. 25, 2017 for corresponding International Application No. PCT/US2016/067246, 12 pages.

(Continued)

*Primary Examiner* — Jennifer D. Carruth
(74) *Attorney, Agent, or Firm* — Cozen O'Connor (57) ABSTRACT

Systems, devices, and methods for preventing eyebox degradation in wearable heads-up displays ("WHUDs") are described. A WHUD may provide an eyebox defined by multiple spatially-separated exit pupils, where the size of the eyebox is influenced by the spacing between the exit pupils. A larger eyebox is achieved with larger spacing between the exit pupils but a larger spacing between exit pupils is susceptible to the formation of gaps or blind spots in the eyebox (eyebox degradation) if bright environmental light causes the user's pupil to constrict to a size that is smaller than the spacing between the exit pupils. A material of variable chromism is included in the user's field of view to reduce the perceived brightness of environmental light and thereby prevent the user's pupil from constricting to a size smaller than the spacing between the exit pupils.

12 Claims, 3 Drawing Sheets

(56) References Cited

U.S. PATENT DOCUMENTS

| | | |
|---|---|---|
| 5,103,323 A | 4/1992 | Magarinos et al. |
| 5,231,674 A | 7/1993 | Cleveland et al. |
| 5,467,104 A | 11/1995 | Furness, III et al. |
| 5,589,956 A | 12/1996 | Morishima et al. |
| 5,596,339 A | 1/1997 | Furness, III et al. |
| 5,742,421 A | 4/1998 | Wells et al. |
| 5,760,931 A | 6/1998 | Saburi et al. |
| 6,008,781 A | 12/1999 | Furness, III et al. |
| 6,027,216 A | 2/2000 | Guyton et al. |
| 6,139,146 A | 10/2000 | Zhang |
| 6,184,847 B1 | 2/2001 | Fateh et al. |
| 6,204,829 B1 | 3/2001 | Tidwell |
| 6,236,476 B1 | 5/2001 | Son et al. |
| 6,317,103 B1 | 11/2001 | Furness, III et al. |
| 6,353,503 B1 | 3/2002 | Spitzer et al. |
| 6,377,277 B1 | 4/2002 | Yamamoto |
| 6,545,778 B2 | 4/2003 | Ono et al. |
| 6,639,570 B2 | 10/2003 | Furness, III et al. |
| 6,972,734 B1 | 12/2005 | Ohshima et al. |
| 7,473,888 B2 | 1/2009 | Wine et al. |
| 7,640,007 B2 | 12/2009 | Chen et al. |
| 7,684,105 B2 | 3/2010 | Lamontagne et al. |
| 7,747,113 B2 | 6/2010 | Mukawa et al. |
| 7,773,111 B2 | 8/2010 | Cleveland et al. |
| 7,850,306 B2 | 12/2010 | Uusitalo et al. |
| 7,925,100 B2 | 4/2011 | Howell et al. |
| 7,927,522 B2 | 4/2011 | Hsu |
| 8,120,828 B2 | 2/2012 | Schwerdtner |
| 8,179,604 B1 | 5/2012 | Gomez et al. |
| 8,188,937 B1 | 5/2012 | Amafuji et al. |
| 8,233,204 B1 | 7/2012 | Robbins et al. |
| 8,355,671 B2 | 1/2013 | Kramer et al. |
| 8,560,976 B1 | 10/2013 | Kim |
| 8,634,119 B2 | 1/2014 | Bablumyan et al. |
| 8,666,212 B1 | 3/2014 | Amirparviz |
| 8,704,882 B2 | 4/2014 | Turner |
| 8,922,481 B1 | 12/2014 | Kauffmann et al. |
| 8,922,898 B2 | 12/2014 | Legerton et al. |
| 8,970,571 B1 | 3/2015 | Wong et al. |
| 8,971,023 B2 | 3/2015 | Olsson et al. |
| 9,086,687 B2 | 7/2015 | Park et al. |
| 9,135,708 B2 | 9/2015 | Ebisawa |
| 9,223,152 B1 | 12/2015 | Kress et al. |
| 2001/0033402 A1 | 10/2001 | Popovich |
| 2002/0003627 A1 | 1/2002 | Rieder |
| 2002/0007118 A1 | 1/2002 | Adachi et al. |
| 2002/0030636 A1 | 3/2002 | Richards |
| 2002/0093701 A1 | 7/2002 | Zhang et al. |
| 2002/0120916 A1 | 8/2002 | Snider, Jr. |
| 2004/0174287 A1 | 9/2004 | Deak |
| 2005/0012715 A1 | 1/2005 | Ford |
| 2005/0219668 A1 | 10/2005 | Taghizadeh |
| 2005/0234348 A1 | 10/2005 | Watanabe et al. |
| 2006/0238707 A1 | 10/2006 | Elvesjo et al. |
| 2007/0047038 A1* | 3/2007 | Takizawa ............... G03F 7/001 359/3 |
| 2007/0078308 A1 | 4/2007 | Daly |
| 2007/0132785 A1 | 6/2007 | Ebersole, Jr. et al. |
| 2009/0109241 A1 | 4/2009 | Tsujimoto |
| 2009/0179824 A1 | 7/2009 | Tsujimoto et al. |
| 2009/0207464 A1 | 8/2009 | Wiltshire et al. |
| 2009/0258669 A1 | 10/2009 | Nie et al. |
| 2009/0322653 A1 | 12/2009 | Putilin et al. |
| 2010/0053555 A1 | 3/2010 | Enriquez et al. |
| 2010/0060551 A1 | 3/2010 | Sugiyama et al. |
| 2010/0142015 A1 | 6/2010 | Kuwahara et al. |
| 2010/0149073 A1 | 6/2010 | Chaum et al. |
| 2010/0150415 A1 | 6/2010 | Atkinson et al. |
| 2010/0157400 A1 | 6/2010 | Dimov et al. |
| 2010/0239776 A1 | 9/2010 | Yajima et al. |
| 2012/0002256 A1 | 1/2012 | Lacoste et al. |
| 2012/0139817 A1 | 6/2012 | Freeman |
| 2012/0169752 A1 | 7/2012 | Kurozuka |
| 2012/0182309 A1 | 7/2012 | Griffin et al. |
| 2012/0188158 A1 | 7/2012 | Tan et al. |
| 2012/0249797 A1 | 10/2012 | Haddick et al. |
| 2012/0290401 A1 | 11/2012 | Neven |
| 2012/0302289 A1 | 11/2012 | Kang |
| 2013/0009853 A1 | 1/2013 | Hesselink et al. |
| 2013/0016292 A1 | 1/2013 | Miao et al. |
| 2013/0016413 A1 | 1/2013 | Saeedi et al. |
| 2013/0088413 A1 | 4/2013 | Raffle et al. |
| 2013/0135722 A1 | 5/2013 | Yokoyama |
| 2013/0165813 A1 | 6/2013 | Chang et al. |
| 2013/0169560 A1 | 7/2013 | Cederlund et al. |
| 2013/0182224 A1 | 7/2013 | Schwiegerling et al. |
| 2013/0198694 A1 | 8/2013 | Rahman et al. |
| 2013/0215235 A1 | 8/2013 | Russell |
| 2013/0222384 A1 | 8/2013 | Futterer |
| 2013/0265437 A1 | 10/2013 | Thörn et al. |
| 2013/0285901 A1 | 10/2013 | Lee et al. |
| 2013/0293591 A1 | 11/2013 | Miller et al. |
| 2013/0300652 A1 | 11/2013 | Raffle et al. |
| 2013/0332196 A1 | 12/2013 | Pinsker |
| 2013/0335302 A1 | 12/2013 | Crane et al. |
| 2014/0045547 A1 | 2/2014 | Singamsetty et al. |
| 2014/0125760 A1 | 5/2014 | Au et al. |
| 2014/0198034 A1 | 7/2014 | Bailey et al. |
| 2014/0198035 A1 | 7/2014 | Bailey et al. |
| 2014/0202643 A1 | 7/2014 | Hikmet et al. |
| 2014/0204455 A1 | 7/2014 | Popovich et al. |
| 2014/0204465 A1 | 7/2014 | Yamaguchi |
| 2014/0226193 A1 | 8/2014 | Sun |
| 2014/0232651 A1 | 8/2014 | Kress et al. |
| 2014/0285429 A1 | 9/2014 | Simmons |
| 2014/0368896 A1 | 12/2014 | Nakazono et al. |
| 2015/0036221 A1 | 2/2015 | Stephenson |
| 2015/0145777 A1 | 5/2015 | He et al. |
| 2015/0156716 A1 | 6/2015 | Raffle et al. |
| 2015/0205126 A1 | 7/2015 | Schowengerdt |
| 2015/0205134 A1 | 7/2015 | Bailey et al. |
| 2015/0268821 A1 | 9/2015 | Ramsby et al. |
| 2015/0325202 A1 | 11/2015 | Lake et al. |
| 2015/0362734 A1 | 12/2015 | Moser et al. |
| 2015/0378161 A1 | 12/2015 | Bailey et al. |
| 2015/0378162 A1 | 12/2015 | Bailey et al. |
| 2015/0378164 A1 | 12/2015 | Bailey et al. |
| 2016/0004090 A1 | 1/2016 | Popovich et al. |
| 2016/0033771 A1 | 2/2016 | Tremblay et al. |
| 2016/0154244 A1 | 6/2016 | Border et al. |
| 2016/0202081 A1 | 7/2016 | Debieuvre et al. |
| 2016/0227164 A1 | 8/2016 | Klug et al. |
| 2016/0238845 A1 | 8/2016 | Alexander et al. |
| 2016/0246384 A1 | 8/2016 | Mullins et al. |
| 2016/0252742 A1 | 9/2016 | Wakabayashi |
| 2016/0274365 A1 | 9/2016 | Bailey et al. |
| 2016/0274758 A1 | 9/2016 | Bailey |
| 2016/0291543 A1 | 10/2016 | Saito |
| 2016/0313899 A1 | 10/2016 | Noel |
| 2016/0327796 A1 | 11/2016 | Bailey et al. |
| 2016/0327797 A1 | 11/2016 | Bailey et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0377865 A1 | 12/2016 | Alexander et al. |
| 2016/0377866 A1 | 12/2016 | Alexander et al. |
| 2017/0068095 A1 | 3/2017 | Holland et al. |
| 2017/0097753 A1 | 4/2017 | Bailey et al. |
| 2017/0115483 A1 | 4/2017 | Aleem et al. |
| 2017/0153701 A1 | 6/2017 | Mahon et al. |
| 2017/0180690 A1 | 6/2017 | Jackson |
| 2017/0199383 A1 | 7/2017 | Machida |
| 2017/0205876 A1 | 7/2017 | Vidal et al. |
| 2017/0212290 A1 | 7/2017 | Alexander et al. |
| 2017/0212349 A1 | 7/2017 | Bailey et al. |
| 2017/0219829 A1 | 8/2017 | Bailey et al. |
| 2017/0299956 A1 | 10/2017 | Holland et al. |
| 2017/0343796 A1 | 11/2017 | Bailey et al. |
| 2017/0343797 A1 | 11/2017 | Bailey et al. |
| 2018/0007255 A1 | 1/2018 | Tang |
| 2018/0035087 A1 | 2/2018 | Xu |
| 2018/0045955 A1 | 2/2018 | Alexander et al. |

(56) References Cited

U.S. PATENT DOCUMENTS

| | | |
|---|---|---|
| 2018/0129052 A1 | 5/2018 | Morrison |
| 2018/0129057 A1 | 5/2018 | Morrison et al. |
| 2018/0129058 A1 | 5/2018 | Morrison et al. |

FOREIGN PATENT DOCUMENTS

| | | |
|---|---|---|
| JP | 2013-127489 A | 6/2013 |
| JP | 2013-160905 A | 8/2013 |
| KR | 10-2004-0006609 A | 1/2004 |
| WO | 2014/155288 A2 | 10/2014 |
| WO | 2015/123775 A1 | 8/2015 |

OTHER PUBLICATIONS

International Search Report and Written Opinion, dated Dec. 8, 2016, for International Application No. PCT/US2016/050225, 15 pages.
International Search Report and Written Opinion, dated Jan. 18, 2017, for International Application No. PCT/US2016/054852, 12 pages.
International Search Report and Written Opinion, dated Oct. 13, 2017, for International Application No. PCT/US2017/040323, 16 pages.
International Search Report and Written Opinion, dated Sep. 28, 2017, for International Application No. PCT/US2017/027479, 13 pages.
Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.
Merriam-Webster, "Radio Frequencies" retrieved from https://www.merriam-webster.com/table/collegiate/radiofre.htm, retrieved on Jul. 12, 2017, 2 pages.
Amitai, "P-27: A Two-Dimensional Aperture Expander for Ultra-Compact, High-Performance Head-Worn Displays," *SID Symposium Digest of Technical Papers* 36(1):360-363, 2005.
Äyräs et al., "Exit pupil expander with a large field of view based on diffractive optics," *Journal of the SID* 17(8):659-664, 2009.
Chellappan et al., "Laser-based displays: a review," *Applied Optics* 49(25):F79-F98, 2010.
Cui et al., "Diffraction from angular multiplexing slanted volume hologram gratings," *Optik* 116:118-122, 2005.
Curatu et al., "Dual Purpose Lens for an Eye-Tracked Projection Head-Mounted Display," International Optical Design Conference 2006, *SPIE-OSA* 6342:63420X-1-63420X-7, 2007.
Curatu et al., "Projection-based head-mounted display with eye-tracking capabilities," *Proc. of SPIE* 5875:58750J-1-58750J-9, 2005.
Essex, "Tutorial on Optomechanical Beam Steering Mechanisms," OPTI 521 Tutorial, College of Optical Sciences, University of Arizona, 8 pages, 2006.
Fernández et al., "Optimization of a thick polyvinyl alcohol-acrylamide photopolymer for data storage using a combination of angular and peristrophic holographic multiplexing," *Applied Optics* 45(29):7661-7666, 2009.

Hainich et al., "Chapter 10: Near-Eye Displays," *Displays: Fundamentals & Applications*, AK Peters/CRC Press, 2011, 65 pages.
Hornstein et al., "Maradin's Micro-Mirror—System Level Synchronization Notes," SID 2012 Digest, pp. 981-984.
International Search Report, dated Jun. 8, 2016, for PCT/US2016/018293, 17 pages.
International Search Report, dated Jun. 8, 2016, for PCT/US2016/018298, 14 pages.
International Search Report, dated Jun. 8, 2016, for PCT/US2016/018299, 12 pages.
Itoh et al., "Interaction-Free Calibration for Optical See-Through Head-Mounted Displays based on 3D Eye Localization," 2014 IEEE Symposium on 3D User Interfaces (3DUI), pp. 75-82, 2014.
Kessler, "Optics of Near to Eye Displays (NEDs)," Presentation—Oasis 2013, Tel Aviv, Feb. 19, 2013, 37 pages.
Kress et al., "A review of head-mounted displays (HMD) technologies and applications for consumer electronics," *Proc. of SPIE* 8720:87200A-1-87200A-13, 2013.
Kress et al., "Diffractive and Holographic Optics as Optical Combiners in Head Mounted Displays," Proceedings of the 2013 ACM Conference on Pervasive and Ubiquitous Computing Adjunct Publication, pp. 1479-1482, 2013.
Kress, "Optical architectures for see-through wearable displays," Presentation—Bay Area—SID Seminar, Apr. 30, 2014, 156 pages.
Levola, "7.1: *Invited Paper*: Novel Diffractive Optical Components for Near to Eye Displays," *SID Symposium Digest of Technical Papers* 37(1):64-67, 2006.
Liao et al., "The Evolution of MEMS Displays," *IEEE Transactions on Industrial Electronics* 56(4):1057-1065, 2009.
Lippert, "Chapter 6: Display Devices: RSD™ (Retinal Scanning Display)," *The Avionics Handbook*, CRC Press, 2001, 8 pages.
Majaranta et al., "Chapter 3—Eye-Tracking and Eye-Based Human-Computer Interaction," in *Advances in Physiological Computing*, Springer-Verlag London, 2014, pp. 17-39.
Schowengerdt et al., "Stereoscopic retinal scanning laser display with integrated focus cues for ocular accommodation" *Proc. of SPIE-IS&T Electronic Imaging* 5291:366-376, 2004.
Silverman et al., "58.5L: *Late-News Paper*: Engineering a Retinal Scanning Laser Display with Integrated Accommodative Depth Cues," SID 03 Digest, pp. 1538-1541, 2003.
Takatsuka et al., "Retinal projection display using diffractive optical element," Tenth International Conference on Intelligent Information Hiding and Multimedia Signal Processing, IEEE, 2014, pp. 403-406.
Urey et al., "Optical performance requirements for MEMS-scanner based microdisplays," Conf. on MOEMS and Miniaturized Systems, *SPIE* 4178:176-185, 2000.
Urey, "Diffractive exit-pupil expander for display applications," *Applied Optics* 40(32):5840-5851, 2001.
Viirre et al., "The Virtual Retinal Display: A New Technology for Virtual Reality and Augmented Vision in Medicine," *Proc. of Medicine Meets Virtual Reality*, IOS Press and Ohmsha, 1998, pp. 252-257. (6 pages).

\* cited by examiner

SYSTEMS, DEVICES, AND METHODS FOR PREVENTING EYEBOX DEGRADATION IN A WEARABLE HEADS-UP DISPLAY

BACKGROUND

Technical Field

The present systems, devices, and methods generally relate to preventing eyebox degradation in a wearable heads-up display and particularly relate to preventing pupil constriction in a user of a wearable heads-up display in order to maintain a larger eyebox.

Description of the Related Art

Wearable Heads-Up Displays

A wearable heads-up display is a head-mounted display that enables the user to see displayed content but does not prevent the user from being able to see their external environment. A wearable heads-up display is an electronic device that is worn on a user's head and, when so worn, secures at least one electronic display within a viewable field of at least one of the user's eyes, regardless of the position or orientation of the user's head. This at least one display is either transparent or at a periphery of the user's field of view so that the user is still able to see their external environment. Examples of wearable heads-up displays include: the Google Glass®, the Optinvent Ora®, the Epson Moverio®, the Sony Glasstron®, just to name a few.

The optical performance of a wearable heads-up display is an important factor in its design. However, the size of the eyeglass frame industry clearly highlights that, when it comes to face-worn devices, users also care a lot about aesthetics. Independent of their performance limitations, many of the aforementioned wearable heads-up displays have struggled to find traction in consumer markets because, at least in part, they lack fashion appeal. Most wearable heads-up displays presented to date employ large display components and, as a result, most wearable heads-up displays presented to date are considerably bulkier than conventional eyeglass frames.

A challenge in the design of wearable heads-up display devices is to minimize the bulk of the face-worn apparatus while still maximizing the visual quality of displayed content. There is a need in the art for wearable heads-up display devices of more aesthetically-appealing design that are capable of providing high-quality images to the user without limiting the user's ability to see their external environment.

Eyebox

In near-eye optical devices such as rifle scopes and wearable heads-up displays, the range of eye positions (relative to the device itself) over which specific content/imagery provided by the device is visible to the user is generally referred to as the "eyebox." An application in which content is only visible from a single or small range of eye positions has a "small eyebox" and an application in which content is visible from a wide range of eye positions has a "large eyebox." The eyebox may be thought of as a volume in space positioned near the optical device. When the eye of the user (and more particularly, the pupil of the eye of the user) is positioned inside this volume, and facing the device, the user is able to see all of the content provided by the device. When the eye of the user is positioned outside of this volume, the user is not able to see at least some of the content provided by the device.

The geometry (i.e., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

Demonstrated techniques for providing a wearable heads-up display with a large eyebox generally necessitate adding more bulky optical components to the display. Technologies that enable a wearable heads-up display of minimal bulk (relative to conventional eyeglass frames) to provide a large eyebox are generally lacking in the art.

BRIEF SUMMARY

A holographic combiner for use in a wearable heads-up display may be summarized as including: an eyeglass lens; a holographic optical element carried by the eyeglass lens; and a material of variable chromism carried by the eyeglass lens. The holographic optical element may include a film of material selected from a group consisting of: photopolymer and silver halide.

The holographic optical element may include at least one hologram. The at least one hologram may be a fast-converging hologram that reflects light impingent thereon from a first range of incidence angles and converges the light to a point less than about 3 cm from the holographic optical element.

The holographic optical element may include a plurality of multiplexed holograms. The plurality of multiplexed holograms may include at least one hologram selected from a group consisting of: an angle-multiplexed hologram and a wavelength-multiplexed hologram.

The eyeglass lens may include a prescription eyeglass lens. The material of variable chromism may be selected from a group consisting of: a photochromic material, an electrochromic material, a thermochromic material, and a cathodochromic material.

The material of variable chromism may be variable between a first level of optical transparency and a second level of optical transparency, the first level of optical transparency greater than the second level of optical transparency. The material of variable chromism may be continuously variable between the first level of optical transparency and the second level of optical transparency.

The holographic optical element may be carried on a first surface of the eyeglass lens and the material of variable chromism is carried on a second surface of the eyeglass lens, the second surface opposite the first surface across a thickness of the eyeglass lens. The eyeglass lens may be curved, and the holographic optical element may be carried on an inner concave surface of the eyeglass lens while the material of variable chromism may be carried on an outer convex surface of the eyeglass lens.

At least one of the holographic optical element and the material of variable chromism may be carried within the eyeglass lens. The eyeglass lens may be optically transparent.

A wearable heads-up display may be summarized as including: a support structure that in use is worn on a head of a user; a scanning laser projector carried by the support structure; a holographic combiner carried by the support structure, wherein the holographic combiner is positioned within a field of view of an eye of the user when the support structure is worn on the head of the user, and wherein the holographic combiner comprises: an eyeglass lens; a holographic optical element carried by the eyeglass lens; and a material of variable chromism carried by the eyeglass lens.

The holographic optical element of the holographic combiner may receive light signals from the scanning laser projector and converge the light signals to multiple spatially-separated exit pupils at or proximate the eye of the user. The wearable heads-up display may further include an eyebox expander carried by the support structure and positioned in an optical path between the scanning laser projector and the holographic combiner, wherein the eyebox expander divides light from the scanning laser projector into multiple spatially-separated paths directed towards the holographic combiner in order to define the multiple spatially-separated exit pupils at or proximate the eye of the user.

The material of variable chromism may be variable between a first level of optical transparency and a second level of optical transparency, the first level of optical transparency greater than the second level of optical transparency.

A method of preventing eyebox degradation in a wearable heads-up display, wherein the eyebox of the wearable heads-up display comprises multiple spatially-separated exit pupils at or proximate an eye of a user of the wearable heads-up display, may be summarized as including: positioning a material of variable chromism in a field of view of the eye of the user; and varying an optical transparency of the material of variable chromism to compensate for variations in a brightness of an environmental light. Varying an optical transparency of the material of variable chromism in response to variations in a brightness of environmental light may include: configuring the material of variable chromism with a first level of optical transparency while the brightness of the environmental light is at a first level of brightness; and in response to the brightness of the environmental light changing from the first level of brightness to a second level of brightness, the second level of brightness brighter than the first level of brightness: configuring the material of variable chromism with a second level of optical transparency, the second level of optical transparency less than the first level of optical transparency.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for preventing eyebox degradation in a wearable heads-up display ("WHUD"). Various WHUD architectures provide an expanded eyebox using multiple spatially-separated exit pupils at or proximate the eye of the user. Examples of such architectures include, without limitation, those described in: U.S. Provisional Patent Application Ser. No. 62/117,316, US Patent Application Publication US 2016-0377865 A1, US Patent Application Publication US 2016-0377866 A1, US Patent Application Publication US 2016-0238845 A1, U.S. Provisional Patent Application Ser. No. 62/156,736, U.S. Non-Provisional patent application Ser. No. 15/145,576, US Patent Application Publication US 2016-0327797 A1, US Patent Application Publication US 2016-0327796 A1, U.S. Provisional Patent Application Ser. No. 62/242,844, and U.S. Non-Provisional patent application Ser. No. 15/147,638, as well as waveguide-based approaches such as that employed in the Lumus® Optical Engines available from Lumus Ltd. In such architectures, the shape and size of the eyebox is typically defined by the number and configuration of exit pupils at or proximate the eye of the user. The exit pupils may be arranged (e.g., spatially distributed, tiled, or similar) over an area of the user's eye so that at least one exit pupil impinges on the eye's pupil for a range of the eye's pupil positions. As long as at least one exit pupil is impingent on the eye's pupil then the user is typically able to see the displayed image in its entirety and the eye's pupil is said to be "within the eyebox." The greater the range of pupil positions over which at least one exit pupil is impingent on the eye's pupil, the larger the eyebox of the WHUD. For pupil positions at which no exit pupil impinges on the eye's pupil, the eye is said to be "outside of the eyebox" and the user is not able to see a displayed image. Furthermore, each additional exit pupil provided by the WHUD typically adds complexity to the overall display architecture which can undesirably add bulk and other aesthetically unappealing elements to the WHUD design. Each additional exit pupil included in an eyebox can also degrade other aspects of the display, such as field of view and display resolution. For these and other reasons, there is typically a limit to the number of exit pupils used to define an eyebox in a WHUD.

For a WHUD architecture that implements a maximum of N exit pupils, the size of the eyebox is heavily influenced by the way in which the N exit pupils are arranged over the area of the eye. The eyebox may be relatively large when the N exit pupils are spaced apart over a relatively large area A and the eyebox may be relatively small when the N exit pupils are spaced apart over a relatively small area a. In this respect a larger spacing between the N exit pupils (over the relatively larger area A) is generally advantageous because such can provide a larger eyebox than a smaller spacing between the N exit pupils; however, the maximum spacing between the N exit pupils is influenced by the expected size (i.e., diameter) of the eye's pupil. Since the eyebox is defined by the range of eye positions in which at least one exit pupil impinges on the eye's pupil, an ideal eyebox generally should not employ a spacing between exit pupils that is so large that regions exist in between adjacent exit pupils in which the eye's pupil can fit such that no exit pupil is impingent thereon. In other words, if the spacing between two adjacent exit pupils is larger than the expected diameter of the eye's pupil then when the eye's pupil is positioned in between the two adjacent exit pupils the eye's pupil is outside of the eyebox and the user is not able to see the display. Such a scenario creates a discontinuous eyebox, or rather, a number of separate eyeboxes over the area of the user's eye. In some applications (e.g., when the WHUD is operated as a glanceable WHUD) separate eyeboxes with "blind" (with respect to displayed content) regions therebetween can be acceptable, but in a WHUD for which displayed content is preferred to be "always present" or generally for which a single continuous eyebox is preferred, "blind" spaces in between adjacent exit pupils are not acceptable. In the present systems, devices, and methods, a scenario in which undesirable gaps or blind spots form in the eyebox (e.g., due to the eye's pupil constricting to a diameter that is less than the spacing between adjacent exit pupils as a result of, for example, bright light shining on the eye) is an example of "eyebox degradation." The various embodiments described herein provide systems, devices, and methods for preventing eyebox degradation.

In order to ensure there are no "blind" regions or "gaps" in an eyebox, the maximum spacing between exit pupils may be chosen as less than or equal to the minimum expected diameter of the eye's pupil during use. However, of course, the diameter of the eye's pupil is variable depending on, at least, the brightness or intensity of light impingent thereon. A WHUD is typically transparent, so the diameter of the eye's pupil is typically not controlled by the brightness of displayed content alone but is also susceptible to the brightness of environmental light (i.e., light coming from the user's environment that is transmitted through the WHUD). If the minimum possible diameter for the eye's pupil (typically about 2 mm) is used as the definition for the maximum separation between adjacent exit pupils then, for a limited number of exit pupils N, the resulting eyebox is smaller than if a larger spacing between the N exit pupils is employed. In accordance with the present systems, devices, and methods, it follows that it can be advantageous to use a maximum spacing between exit pupils that is larger than the typical minimum diameter of the eye's pupil, provided that a mechanism is put in place to ensure that the eye's pupil does not constrict to its minimum diameter while the WHUD is in use. The various embodiments described herein provide systems, devices, and methods for WHUD architectures that include at least one material of variable chromism operative to respond to changes in environmental light and advantageously compensate therefor to limit the brightness of environmental light perceived by the user and thereby ensure that the eye's pupil does not constrict to a diameter below the maximum spacing between adjacent exit pupils in the WHUD's eyebox.

Figure 1:
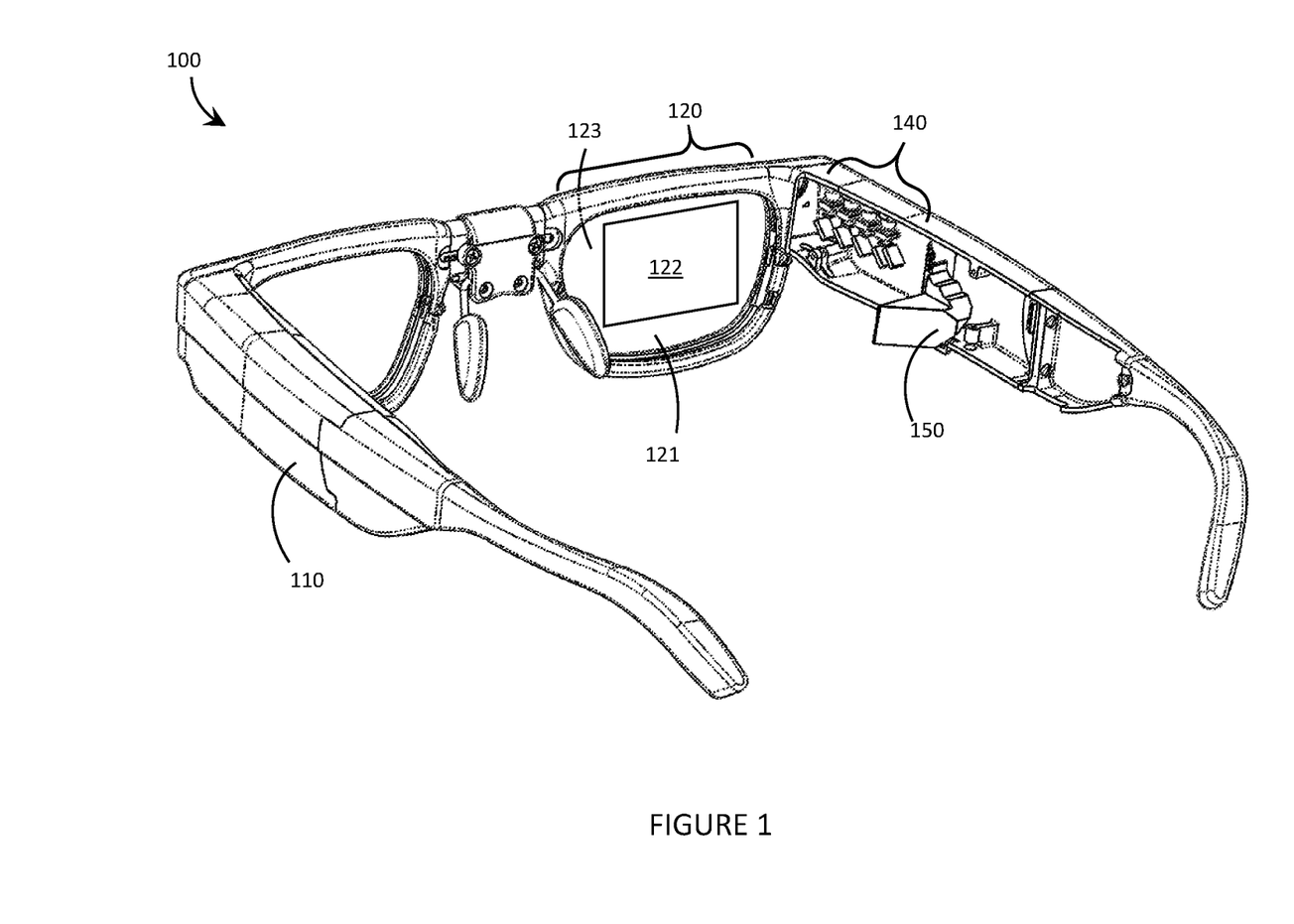
FIG. 1 is a partially exploded perspective view of a wearable heads-up display that prevents degradation of the eyebox in accordance with the present systems, devices, and methods.

FIG. 1 is a partially exploded perspective view of a WHUD 100 that prevents degradation of the eyebox in accordance with the present systems, devices, and methods. WHUD 100 includes a support structure 110 that has a general shape and appearance of an eyeglasses (or sunglasses) frame. Carried by support structure 110 are: a scanning laser projector ("SLP") 140; an eyebox expander 150; and a holographic combiner 120 positioned within a field of view of at least one eye of the user when support structure 110 is worn on the head of the user. Portions of SLP 140 and eyebox expander 150 may be contained within an inner volume of support structure 110; however, FIG. 1 provides a partially exploded view in which regions of support structure 110 have been removed in order to render visible portions of SLP 140 and eyebox expander 150 that may otherwise be concealed. Eyebox expander 150 is positioned in an optical path between scanning laser projector 140 and holographic combiner 120 and divides light from scanning laser projector 140 into multiple spatially-separated paths directed towards holographic combiner 120 in order to define the multiple spatially-separated exit pupils at or proximate the eye of the user. Depending on the specific implementation, eyebox expander 150 may replicate light from scanning laser projector 140, e.g., as described in U.S. Provisional Patent Application Ser. No. 62/117,316 and US Patent Application Publication US 2016-0377865 A1, or eyebox expander 150 may split the range of light signals from scanning laser projector 140 into sub-ranges as described in, e.g., U.S. Provisional Patent Application Ser. No. 62/156,736, U.S. Non-Provisional patent application Ser. No. 15/145,576, US Patent Application Publication US 2016-0327797 A1, US Patent Application Publication US 2016-0327796 A1, and U.S. Provisional Patent Application Ser. No. 62/242,844, US Patent Application Publication US 2016-0377866 A1, and/or U.S. Non-Provisional patent application Ser. No. 15/147,638.

Holographic combiner 120 is referred to as a "combiner" because optically it enables both environmental light (i.e., light from the user's environment) and projected light from WHUD 100 (i.e., displayed content) to be combined into the user's field of view. Holographic combiner may be at least partially transparent and comprises multiple components (e.g., layers), including at least: an eyeglass lens 121 (e.g., an optically transparent eyeglass lens that may be planar or curved and may or may not be a prescription eyeglass lens); a holographic optical element 122 carried by eyeglass lens 121, and a material of variable chromism 123 carried by eyeglass lens 121. Holographic optical element 122 of holographic combiner 120 receives light signals from scanning laser projector 140 (e.g., through eyebox expander 150)

and converges the light signals to multiple spatially-separated exit pupils at or proximate the eye of the user. Material of variable chromism 123 of holographic combiner 120 is variable between a first level of optical transparency and a second level of optical transparency, the first level of optical transparency greater than the second level of optical transparency. In practice, material of variable chromism 123 may be configured in a state corresponding to the first level of optical transparency (e.g., maximally transparent) when WHUD 100 is operated in relatively low light or dim conditions (e.g., in a relatively dark environment, such as indoors and/or at night time) and may be configured in a state corresponding to the second level of optical transparency (e.g., a less transparent state, such as a minimally transparent state) when WHUD 100 is operated in relatively high light or bright conditions (e.g., in a relatively bright environment, such as outdoors on a sunny day). In this way, material of variable chromism 123 compensates for changes in brightness in the user's environment to reduce constriction of the user's pupils and prevent eyebox degradation in WHUD 100.

Throughout this specification and the appended claims, the term "carried by" is generally used to refer to a physical coupling between two objects. The physical coupling may be direct physical coupling (i.e., with direct physical contact between the two objects) or indirect physical coupling that may be mediated by one or more additional objects. Thus, the term "carried by" is meant to generally encompass all manner of direct and indirect physical coupling, including without limitation: carried on, carried within, physically coupled to, and/or supported by, with or without any number of intermediary physical objects therebetween.

Figure 2:
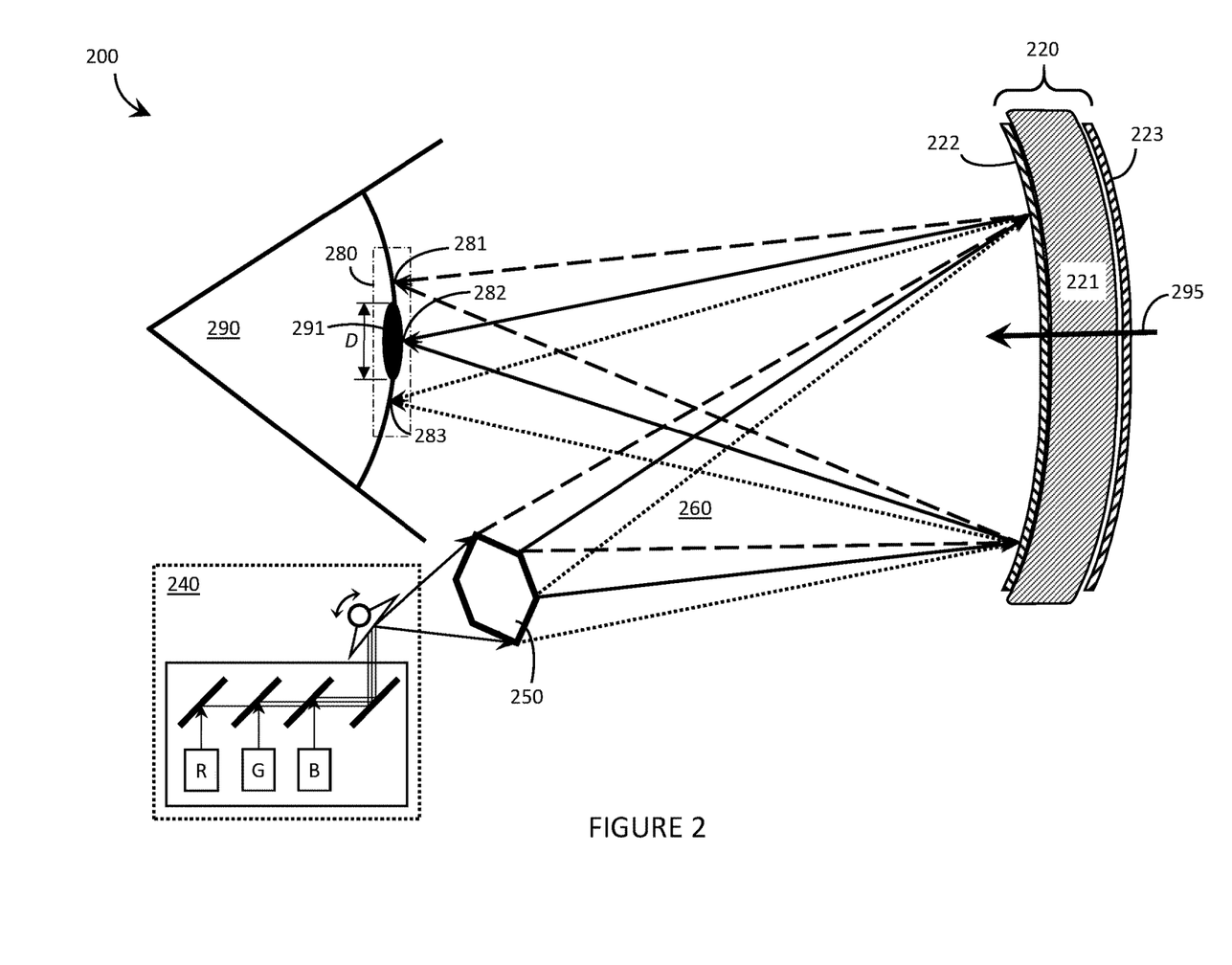
FIG. 2 is an illustrative diagram of an operation of a wearable heads-up display that prevents degradation of the eyebox in accordance with the present systems, devices, and methods.

FIG. 2 is an illustrative diagram of an operation of a WHUD 200 that prevents degradation of the eyebox in accordance with the present systems, devices, and methods. WHUD 200 is substantially similar to WHUD 100 from FIG. 1 but support structure 110 is not illustrated in FIG. 2 in order to reduce clutter. WHUD 200 includes a scanning laser projector 240, an eyebox expander 250, and a holographic combiner 220 that itself comprises an eyeglass lens 221 that carries a holographic optical element 222 and a material of variable chromism 223. In the operation of WHUD 200 depicted in FIG. 2, scanning laser projector 240 scans light signals 260 over holographic combiner 220 (along an optical path that is interrupted by eyebox expander 250, which divides light signals 260 into multiple spatially-separated paths directed towards holographic combiner 220). Holographic optical element 222 of holographic combiner 220 may comprise any of a variety of different materials, including silver halide film and/or a photopolymer film such as Bayfol® HX from Bayer AG. Generally, holographic optical element 222 includes at least one hologram that may be a fast-converging hologram operative to reflect (i.e., redirect by an angle greater than 90°) light signals 260 and converge light signals 260 to multiple exit pupils 281, 282, and 283 at or proximate the eye 290 of the user. For the purposes of the present systems, devices, and methods, "fast-converging" generally means convergence to a point within about 3 cm of holographic optical element 222. In some implementations, holographic optical element 222 of holographic combiner 220 may include a plurality of multiplexed holograms, such as at least two angle-multiplexed holograms and/or at least two wavelength-multiplexed holograms.

WHUD 200 demonstrates an operation that includes three exit pupils 281, 282, and 283, though a person of skill in the art will appreciate that the present systems, devices, and methods apply to any WHUD implementation that employs at least two spatially-separated exit pupils. Three exit pupils 281, 282, and 283 are used in FIG. 2 for illustrative purposes only and alternative implementations may employ more or fewer than three exit pupils, such as two exit pupils, four exit pupils, or greater than four exit pupils. Furthermore, FIG. 2 shows an arrangement of exit pupils 281, 282, and 283 in two dimensions, whereas in practice multiple exit pupils may be spatially-separated in three dimensions at or proximate eye 290.

Three exit pupils 281, 282, 283 collectively define an eyebox 280 which represents the range of positions for pupil 291 of eye 290 for which at least one of exit pupils 281, 282, and 283 will impinge thereon and thereby enable the user to see content displayed by WHUD 200. In the illustrated example, eyebox 280 is designed to accommodate a pupil 291 having a diameter D equal to an average pupil diameter across multiple users in multiple light conditions. Such an average diameter D may be in the range of, for example, about 3-5 cm. Thus, the maximum spacing between adjacent ones of exit pupils 281, 282, and 283 is less than D (i.e., less than 3-5 cm depending on the implementation). This spacing between adjacent ones of exit pupils 281, 282, and 283 allows eyebox 280 to be relatively large (i.e., accommodate a relatively wide range of positions of pupil 291), but in the absence of any further measure it is possible for pupil 291 to constrict (for example, if the user enters a particularly bright environment, such as outside on a sunny day) to a diameter less than D, such as about 2 cm. In this case, pupil 291 may become smaller in diameter than the spacing between adjacent ones of exit pupils 281, 282, and 283 and therefore there will be instances or "gaps" where the user will not be able to see displayed content as pupil 291 moves through eyebox 280. In order to prevent such eyebox degradation, holographic combiner 220 includes material of variable chromism 223.

Material of variable chromism 223 is variable (either controllably or automatically depending on the specific implementation) between a first level of optical transparency and a second level of optical transparency, the first level of optical transparency greater than the second level of optical transparency. Advantageously, material of variable chromism 223 may be continuously variable between the first level of optical transparency and the second level of optical transparency, such that material of variable chromism 223 may operationally exist in various states of optical transparency in between the first level of optical transparency and the second level of optical transparency.

Material of variable chromism 223 varies the optical transparency or "tint" of holographic combiner 220 in response to changes in the environmental brightness in order to limit constriction of pupil 291 and prevent degradation of eyebox 280. Light from the external environment is represented in FIG. 2 by arrow 295. Material of variable chromism 223 may be configured to be, for example, i) maximally optically transparent and apply minimum tint (e.g., zero tint) to holographic combiner 220 when the brightness or intensity of environmental light 295 is sufficiently low that the diameter of pupil 291 is at least as large as the maximum spacing between adjacent ones of exit pupils 281, 282, and 283; and ii) minimally optically transparent and apply a maximum tint to holographic combiner 220 when the brightness or intensity of environmental light 295 is high enough to (in the absence of such tint) cause the diameter of pupil 291 to constrict to less than the size of the maximum spacing between adjacent ones of exit pupils 281, 282, and 283.

The chromism of "material of variable chromism" 223 may be variable in different ways (e.g., by different mechanisms) depending on the specific implementation. For example, material of variable chromism 223 may include: a film of photochromic material that varies chromism (e.g., optical transparency) automatically in response to changes in light impingent thereon; a film of electrochromic material that varies chromism (e.g., optical transparency) in response to a controlled electric current; a film of thermochromic material that varies chromism (e.g., optical transparency) in response to thermal fluctuations; and/or a film of cathodochromic material that varies chromism (e.g., optical transparency) in response to electron beam irradiation. If a passive material such as a photochromic material is used, then the chemical make-up of material of variable chromism 223 may be adjusted to calibrate the transparency range and brightness-response profile of the photochromic material and then the photochromic material may automatically vary in optical transparency in use in WHUD 200. If an active material such as electrochromic material is used, then WHUD 200 may include one or more electrically conductive pathway(s) that communicatively (e.g., electrically) couple to (and, in some implementations, throughout) material of variable chromism 223 and to a controllable current source (not illustrated in FIG. 2) carried by the support structure of WHUD 200.

As previously described, holographic combiner 220 of WHUD 200 includes eyeglass lens 221 (which may or may not be optically transparent, which may or may not be curved, and which may or may not be a prescription eyeglass lens) that carries holographic optical element 222 and material (e.g., film) of variable chromism 223. In the illustrated example of FIG. 2, holographic optical element 222 is carried on a first surface of eyeglass lens 221 and material of variable chromism 223 is carried on a second surface of eyeglass lens 221, the second surface opposite the first surface across a thickness of the eyeglass lens. In order to prevent material of variable chromism 223 from interfering with display content projected from scanning laser projector 240, it may be advantageous for holographic optical element 222 to be positioned "in front of" material of variable chromism 223 with respect to the optical path of light 260 from scanning laser projector 240. When eyeglass lens 221 is curved (e.g., because eyeglass lens 221 is a prescription lens), holographic optical element 222 may be carried on an inner concave surface of eyeglass lens 221 and material of variable chromism 223 may be carried on an outer convex surface of eyeglass lens 221. In some implementations, at least one of holographic optical element 222 and/or material of variable chromism 223 may be carried within eyeglass lens 221.

Either or both of holographic optical element 221 and/or material of variable chromism 223 may be integrated with eyeglass lens using systems, devices, and methods described in U.S. Provisional Patent Application Ser. No. 62/214,600 and U.S. Non-Provisional patent application Ser. No. 15/256,148. When eyeglass lens 221 is curved, holographic optical element 222 may employ systems, devices, and methods described in U.S. Provisional Patent Application Ser. No. 62/268,892 and U.S. Non-Provisional patent application Ser. No. 15/381,883.

The controlled operation of scanning laser projector 240 may involve image processing techniques that control the relative brightness, modulation, alignment, and contribution of each of multiple (e.g., a red, a green, and a blue) laser diodes. Such techniques may generally be calibrated for a particular apparent darkness or opacity of holographic combiner 220 (since holographic combiner 220 is within the field of view, like a projection screen, of all displayed content). The present systems, devices, and methods generally involve varying the apparent darkness or opacity (i.e., transparency) of holographic combiner 220; accordingly, in some implementations it may be advantageous for the image processing system of scanning laser projector to be operative to vary the output of scanning laser projector 240 in order to compensate for changes in the apparent darkness or opacity of holographic combiner 220. For example, as holographic combiner 220 increases in opacity (e.g., because the user has entered a bright environment), scanning laser projector 240 may be modified to reduce the brightness of at least some colors in order to maintain the same overall display brightness and/or in order to maintain the same color balance, or similar. Such may involve a mechanism for conveying environmental brightness information to scanning laser projector 240, such as a photodiode (carried by the support structure) positioned and oriented to detect ambient light brightness (if, e.g., material of variable chromism 223 is passively varied) and/or a communicative link between the control system for material of variable chromism 223 and scanning laser projector 240 (if, e.g., material of variable chromism 223 is actively varied).

Figure 3:
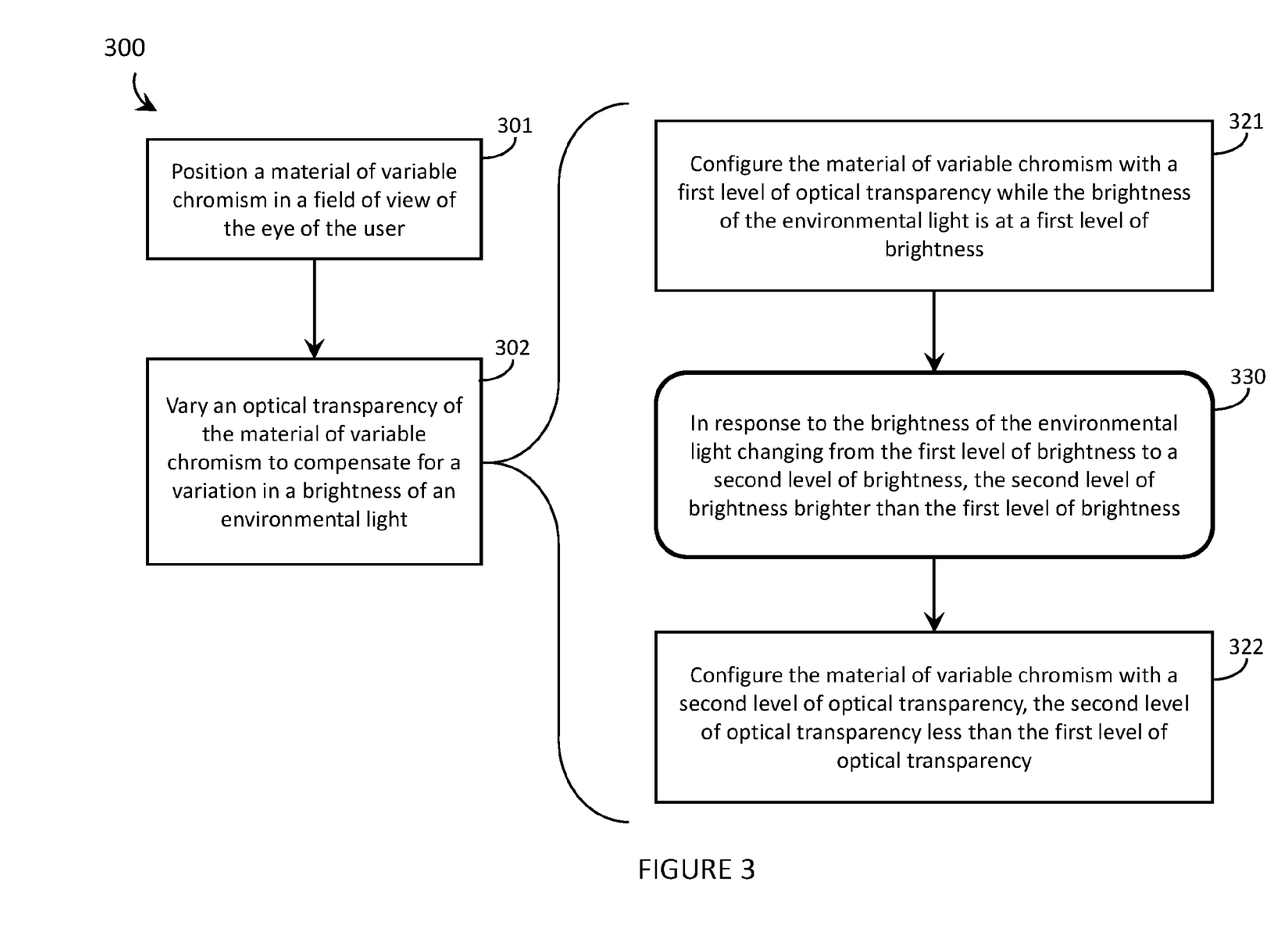
FIG. 3 is a flow-diagram showing a method of preventing eyebox degradation in a wearable heads-up display in accordance with the present systems, devices, and methods.

FIG. 3 is a flow-diagram showing a method 300 of preventing eyebox degradation in a WHUD in accordance with the present systems, devices, and methods. Method 300 includes two main acts 301 and 302, though those of skill in the art will appreciate that in alternative embodiments certain acts may be omitted and/or additional acts may be added. FIG. 3 also shows a particular example of an operation of method 300 in which act 302 comprises two sub-acts 321, 322 and one criterion 330, though those of skill in the art will appreciate that in alternative embodiments act 302 may be completed in an alternative way (i.e., distinct from sub-acts 321, 322 and criterion 330) and certain sub-acts and/or criteria may be omitted and/or additional sub-acts and/or criteria may be added. Those of skill in the art will also appreciate that the illustrated order of the acts, sub-acts, and/or criterion is shown for exemplary purposes only and may change in alternative embodiments. For the purpose of method 300, the term "user" refers to a person that is wearing the WHUD (e.g., 100 or 200).

At 301, a material of variable chromism (123, 223) is positioned in a field of view of an eye of the user. The WHUD (100, 200) may include a holographic combiner (120, 220) that carries the material of variable chromism (123, 223) and positioning the material of variable chromism (123, 223) in the field of view of the eye of the user may involve placing the support structure (110) of the WHUD (100, 200) on the user's head (either by the user or by a third party) so that the holographic combiner (120, 220) is positioned within the field of view of the eye of the user.

At 302, an optical transparency of the material of variable chromism (123, 223) is varied to compensate for a variation in a brightness of an environmental light (295). Variations in the optical transparency of the material of variable chromism (123, 223) may be performed automatically by the material of variable chromism (123, 223) itself (e.g., if the material of variable chromism (123, 223) is a photochromic material) or may be actuated by a transparency control system (e.g., by a controllable electric current source if the material of variable chromism (123, 223) is an electrochromic material). In the latter case, the WHUD may include a photodiode or other sensor to detect, sense, measure, and/or monitor the brightness of environmental light impingent on the WHUD.

Method 300 includes sub-acts 321, 322 and criterion 330 to provide an example of varying an optical transparency of the material of variable chromism (123, 223) in accordance with act 302.

At 321, the material of variable chromism (123, 223) is configured with (e.g., in a state with) a first level of optical transparency while the brightness of the environmental light (295) is at a first level of brightness. The first level of brightness may be a relatively low level of brightness corresponding to, for example, use at night or dimly-lit indoor light conditions.

At 330, a criterion is specified and method 300 only proceeds to sub-act 322 if and when criterion 330 is satisfied. The criterion is that the brightness of the environmental light (295) changes from the first level of brightness to a second level of brightness, the second level of brightness brighter than the first level of brightness. The second level of brightness may be a relatively high level of brightness corresponding to, for example, use outdoors on a sunny day.

FIG. 3 depicts an example of method 300 for which criterion 330 is satisfied so method 300 does proceed from sub-act 321 to sub-act 322.

At 322, the material of variable chromism (123, 223) is configured with (e.g., in a state with) a second level of optical transparency that is less than the first level of transparency. In other words, the opacity of the material of variable chromism (123, 223) is increased. This increase in the opacity of the material of variable chromism (123, 223) reduces the brightness of the environmental light (295) impingent on the eye of the user and thereby prevents the pupil of the user's eye from constricting to a diameter that would be smaller than the spacing between adjacent ones of the spatially-separated exit pupils that make up the eyebox of the WHUD. Such ensures that the user is still able to see displayed content throughout the entire eyebox even in bright ambient light conditions.

The various embodiments described herein provide WHUDs (and holographic combiners for use in WHUDs) that increase in opacity (i.e., reduce in transparency) in response to an increase in environmental brightness in order to prevent eyebox degradation. However, the WHUDs (and holographic combiners for use in WHUDs) described herein may also decrease in opacity (i.e., increase in optical transparency) in response to a decrease in environmental brightness in order to enable the user to better see their external environment.

For an eyebox that is made up of multiple spatially-separated exit pupils, the eyebox may be larger if the spacing between the spatially-separated exit pupils is larger. However, the spacing between the multiple spatially-separated exit pupils typically cannot be larger than the minimum eye pupil size that will be encountered during use of the WHUD, otherwise "gaps" or "blind spots" will appear in the eyebox. By adding a material of variable chromism (optical transparency) with the holographic combiner of the WHUD to mitigate full constriction of the eye's pupil, the present systems, devices, and methods enable a larger spacing between exit pupils to be employed, and a correspondingly larger eyebox, in a WHUD that is suitable for use in bright conditions when the eye's pupil would otherwise be maximally constricted, such as outside on a sunny day. Thus, while the various embodiments described herein prevent eyebox degradation in a WHUD, they likewise enable a WHUD designed for use in sunny outside conditions to provide a larger eyebox.

In WHUD architectures that do not employ a holographic combiner but instead employ a waveguide or diffraction grating or other mechanism to produce multiple spatially-separated exit pupils at our proximate the eye of the user, the present systems, devices, and methods may still be employed. For example, a material of variable chromism may be added to the transparent combiner of virtually any WHUD architecture to prevent eyebox degradation, in which case the transparent combiner may include (in a substantially similar way to as described in the examples herein), for example, an eyeglass lens, a waveguide, and a material of variable chromism or, for another example, an eyeglass lens, a diffraction grating, and a material of variable chromism.

In some implementations, a luminance attenuator such as the one described in U.S. Provisional Patent Application Ser. No. 62/374,181 may be used instead of or in addition to a material of variable chromism in order to control the brightness, or luminance, of environmental light (295) that passes through a WHUD and impinges on a user's eye.

The wearable heads-up displays described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the transparent display(s) any given image should be displayed.

The wearable heads-up displays described herein may include one or more on-board power sources (e.g., one or more battery(ies)), a wireless transceiver for sending/receiving wireless communications, and/or a tethered connector port for coupling to a computer and/or charging the one or more on-board power source(s).

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/288,947, U.S. Provisional Patent Application Ser. No. 62/117,316, US Patent Application Publication US 2016-0377865 A1, US Patent Application Publication US 2016-0377866 A1, US Patent Application Publication US 2016-0238845 A1, U.S. Provisional Patent Application Ser. No. 62/156,736, U.S. Non-Provisional patent application Ser. No. 15/145,576, US Patent Application Publication US 2016-0327797 A1, US Patent Application Publication US 2016-0327796 A1, U.S. Provisional Patent Application Ser. No. 62/242,844, U.S. Non-Provisional patent application Ser. No. 15/147,638, U.S. Provisional Patent Application Ser. No. 62/214,600, U.S. Non-Provisional patent application Ser. No. 15/256,148, U.S. Provisional Patent Application Ser. No. 62/268,892 and U.S. Non-Provisional patent application Ser. No. 15/381,883, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A holographic combiner for use in a wearable heads-up display, the holographic combiner comprising:
an eyeglass lens;
a holographic optical element carried by the eyeglass lens; and
a material of variable chromism carried by the eyeglass lens, wherein the material of variable chromism is continuously variable between a first level of optical transparency and a second level of optical transparency, the first level of optical transparency greater than the second level of optical transparency.

2. The holographic combiner of claim 1 wherein the holographic optical element includes a film of material selected from a group consisting of: photopolymer and silver halide.

3. The holographic combiner of claim 1 wherein the holographic optical element includes at least one hologram.

4. The holographic combiner of claim 3 wherein the at least one hologram is a fast-converging hologram that reflects light impingent thereon from a first range of incidence angles and converges the light to a point less than 3 cm from the holographic optical element.

5. The holographic combiner of claim 1 wherein the holographic optical element includes a plurality of multiplexed holograms.

6. The holographic combiner of claim 5 wherein the plurality of multiplexed holograms includes at least one hologram selected from a group consisting of: an angle-multiplexed hologram and a wavelength-multiplexed hologram.

7. The holographic combiner of claim 1 wherein the eyeglass lens includes a prescription eyeglass lens.

8. The holographic combiner of claim 1 wherein the material of variable chromism is selected from a group consisting of: a photochromic material, an electrochromic material, a thermochromic material, and a cathodochromic material.

9. The holographic combiner of claim 1 wherein the holographic optical element is carried on a first surface of the eyeglass lens and the material of variable chromism is carried on a second surface of the eyeglass lens, the second surface opposite the first surface across a thickness of the eyeglass lens.

10. The holographic combiner of claim 9 wherein the eyeglass lens is curved, and wherein the holographic optical element is carried on an inner concave surface of the eyeglass lens and the material of variable chromism is carried on an outer convex surface of the eyeglass lens.

11. The holographic combiner of claim 1 wherein at least one of the holographic optical element and the material of variable chromism is carried within the eyeglass lens.

12. The holographic combiner of claim 1 wherein the eyeglass lens is optically transparent.

* * * * *